United States Patent [19]

Suzuki et al.

[11] 4,241,940
[45] Dec. 30, 1980

[54] PASSIVE SEATBELT SYSTEM

[75] Inventors: Ichiro Suzuki, Nagoya; Hisashi Ogawa; Masanao Motonami, both of Toyota, all of Japan

[73] Assignee: Toyota Jidosha Kogyo Kabushiki Kaisha, Toyota, Japan

[21] Appl. No.: 17,933

[22] Filed: Mar. 6, 1979

[30] Foreign Application Priority Data

Aug. 16, 1978 [JP] Japan .................. 53-112184[U]

[51] Int. Cl.³ .............................................. B60R 21/10
[52] U.S. Cl. .................................. 280/804; 16/95 R; 74/30; 297/469
[58] Field of Search ............... 280/804, 802, 803, 801, 280/808; 297/482, 483, 469; 16/95 R, 96 R, 91; 74/30, 29

[56] References Cited

U.S. PATENT DOCUMENTS

| 2,671,285 | 3/1954 | Benschoten | 74/29 |
| 3,074,356 | 1/1963 | Parker | 16/95 R |
| 3,874,244 | 4/1975 | Rasmussen | 74/30 |
| 3,882,955 | 5/1975 | Kaneko | 280/804 |
| 3,889,971 | 6/1975 | Kazaoka | 280/804 |
| 3,968,978 | 7/1976 | Hayashi | 280/804 |
| 4,061,365 | 12/1977 | Nagano | 280/804 |

Primary Examiner—John P. Silverstrim
Attorney, Agent, or Firm—Koda and Androlia

[57] ABSTRACT

A passive seatbelt system which includes a guide rail fastened longitudinally to a roof side of a vehicle, a truck movable along the guide rail, a seatbelt which has one end connected to the truck, a slide rail provided adjacent the guide rail and having one end coupled to the guide rail and the other end fastened to a roof support of the vehicle, a flexible tape provided in the slide rail and having one end coupled to the truck a moving means coupled to the flexible tape for causing movement of the flexible tape whereby the seatbelt is caused to approach or recede from a seated passenger to thereby automatically fasten or unfasten the seatbelt.

6 Claims, 18 Drawing Figures

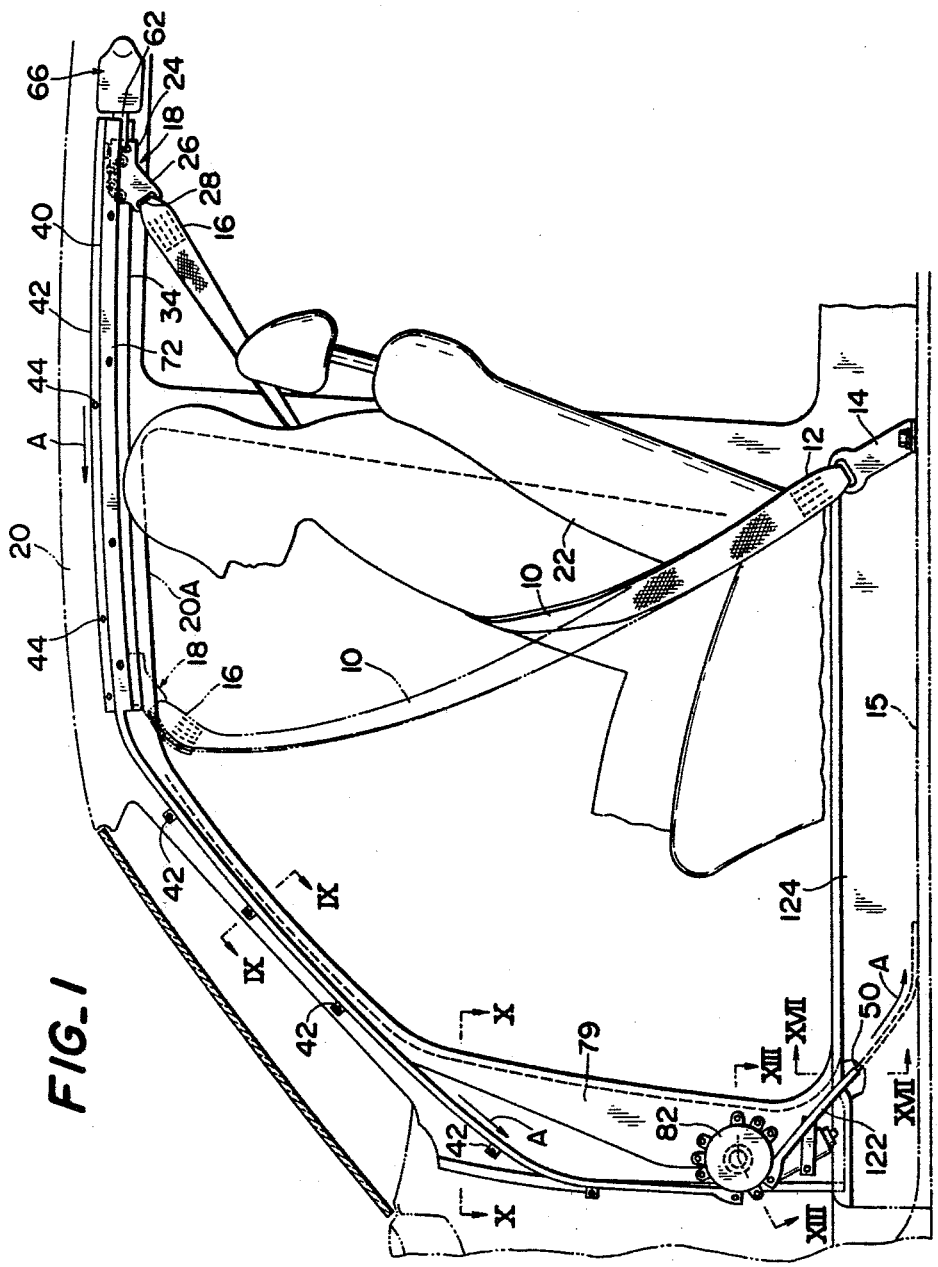

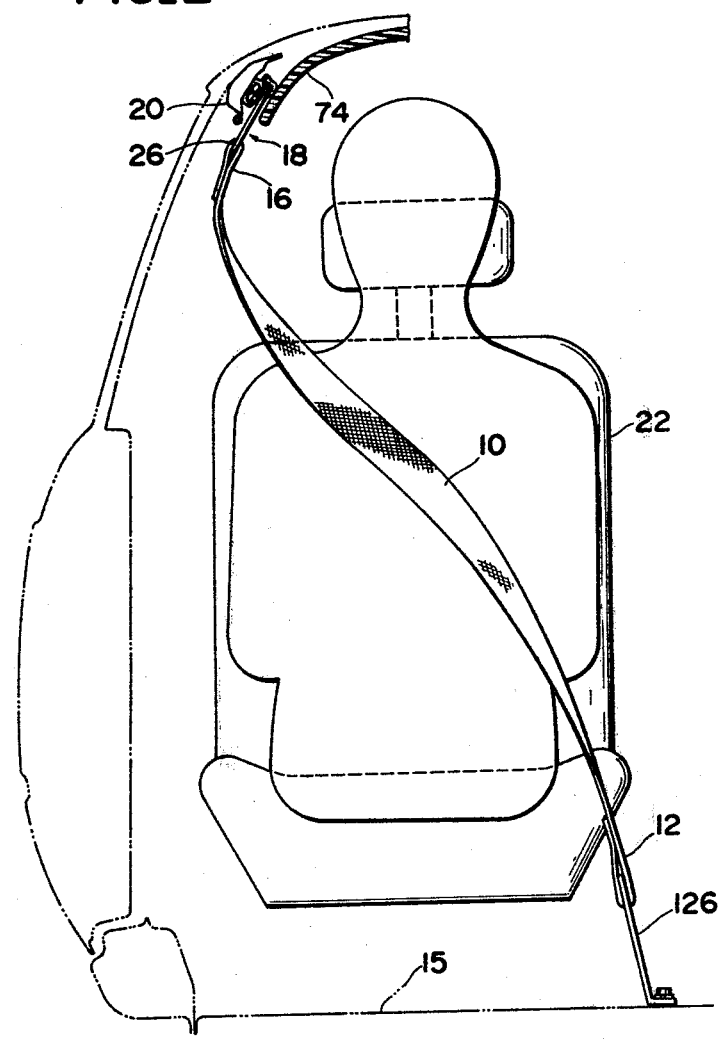
FIG_2

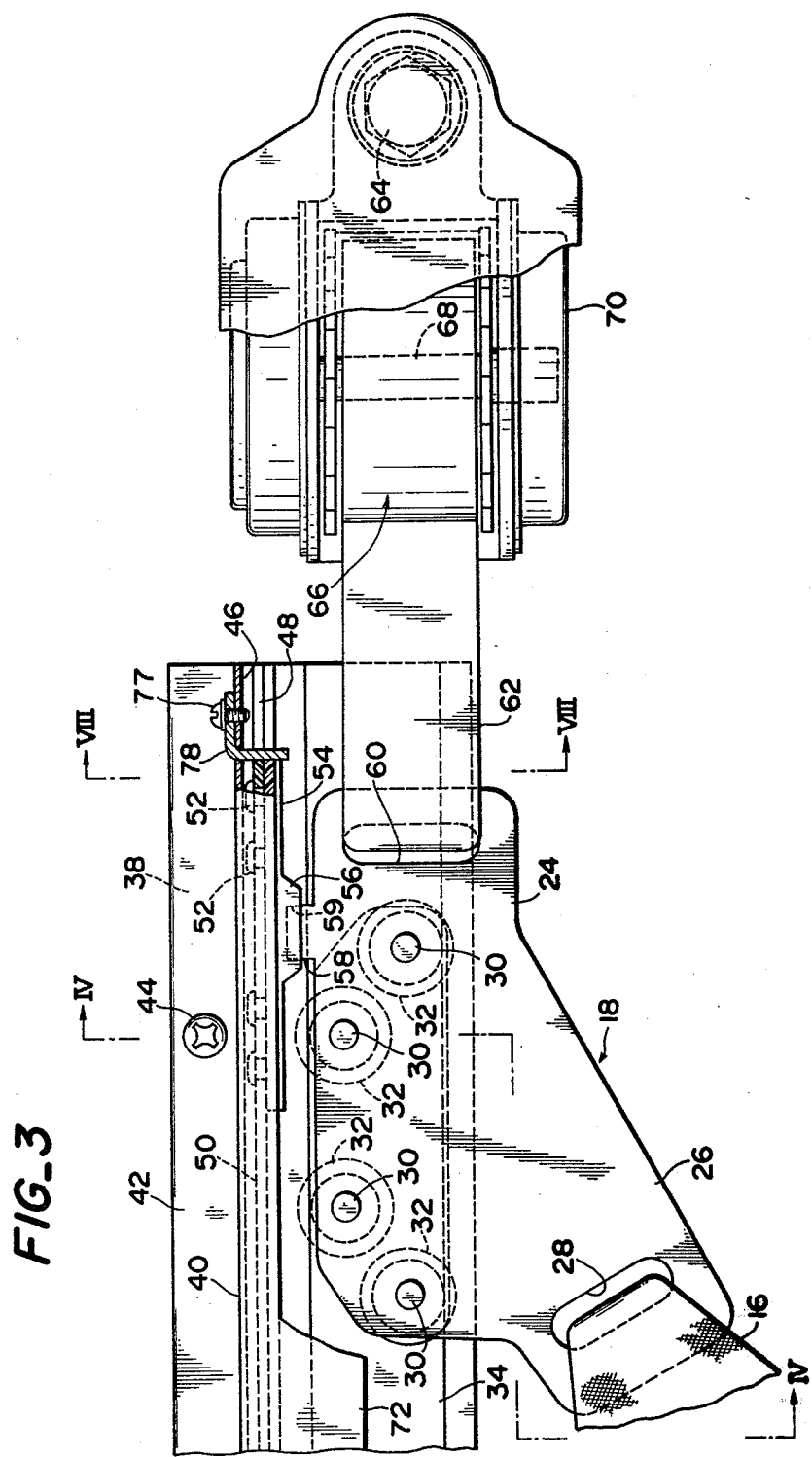

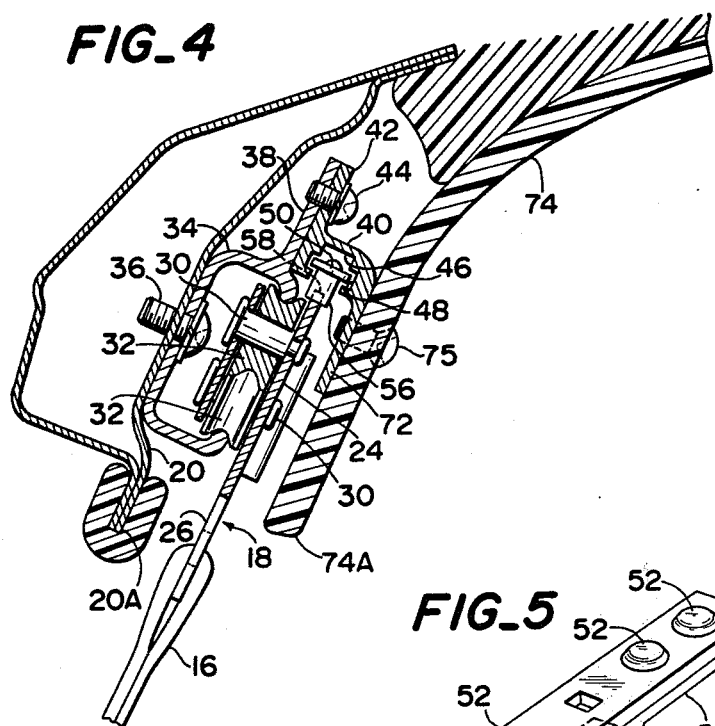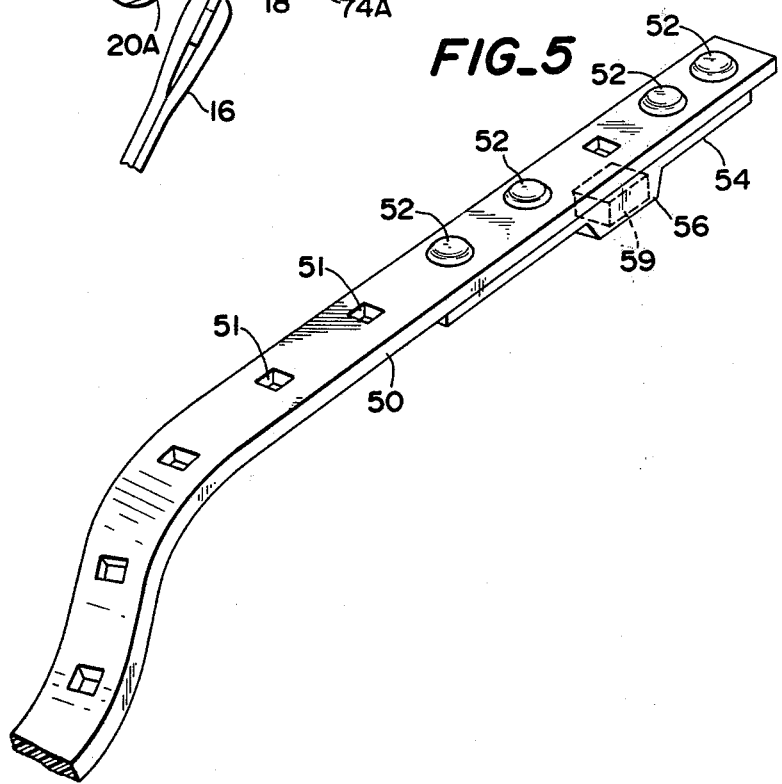

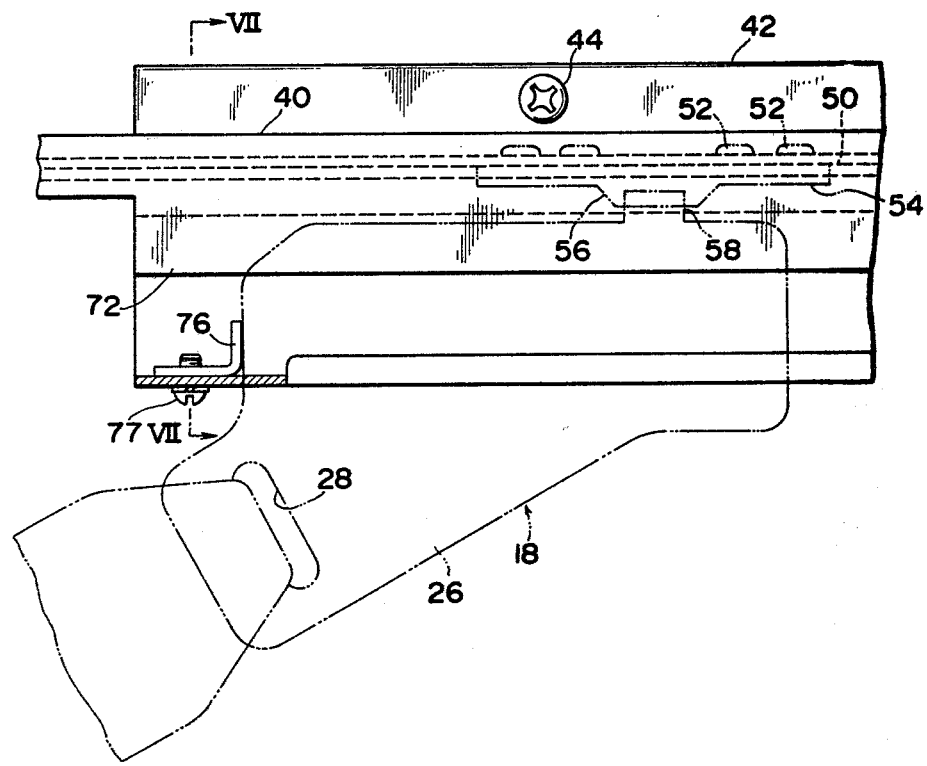
FIG_6
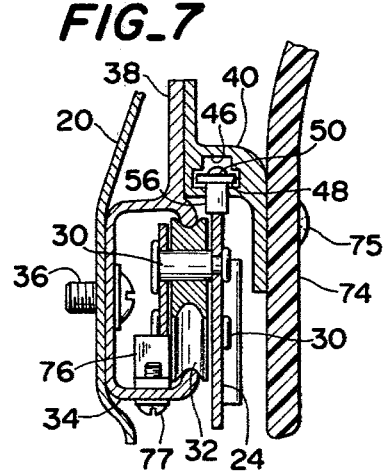
FIG_7
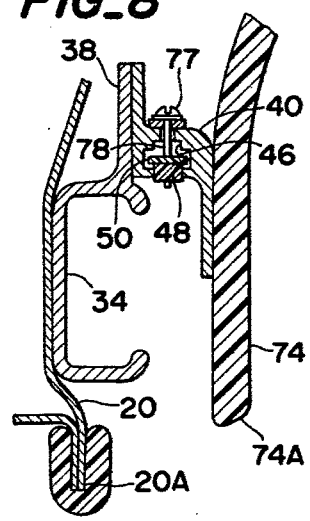
FIG_8

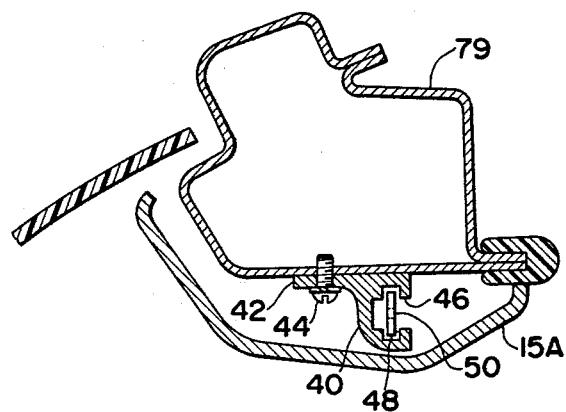
FIG_9
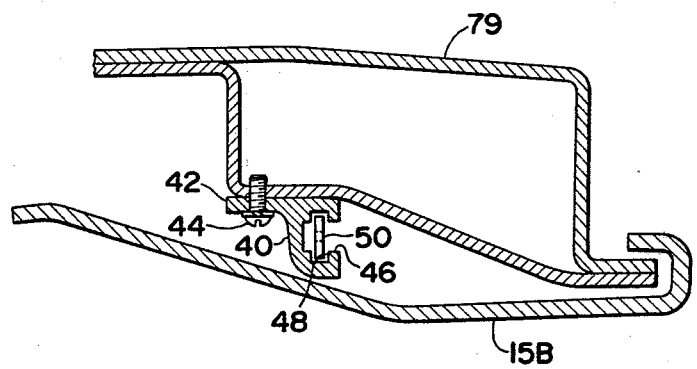
FIG_10

FIG_11
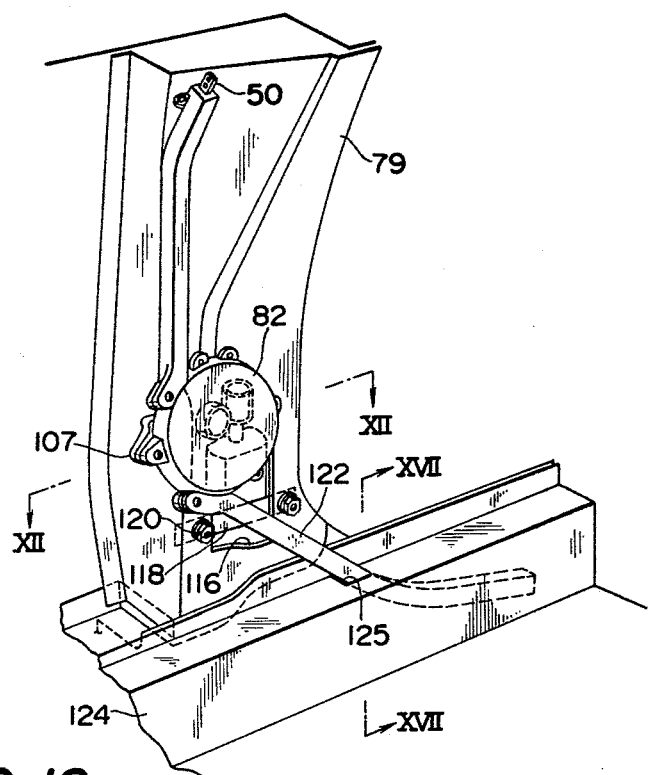
FIG_12
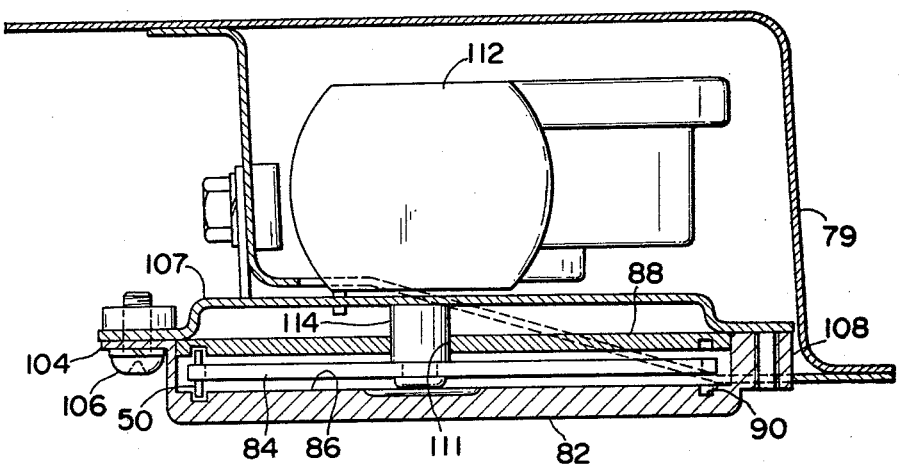

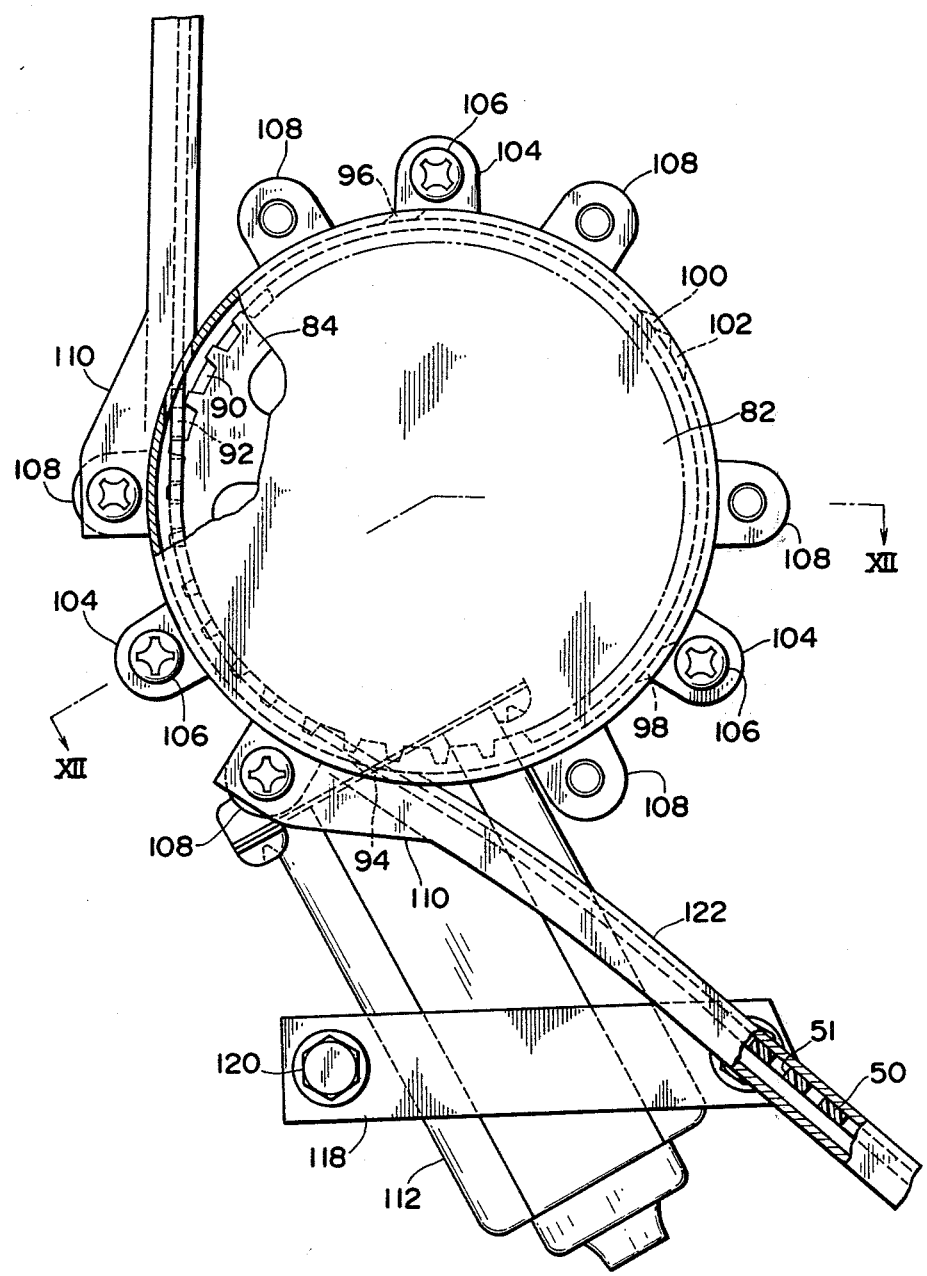
FIG_13

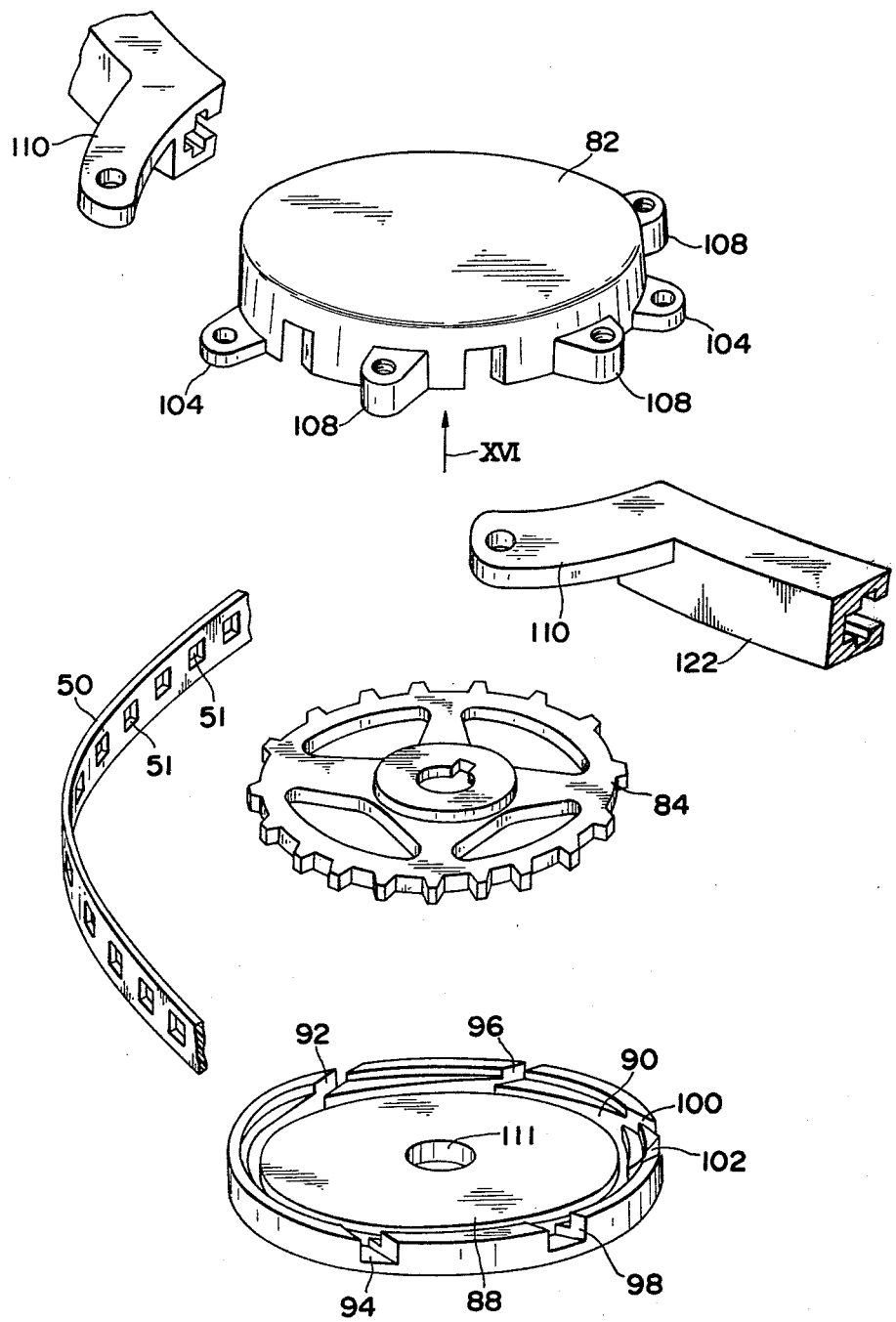
FIG_14

FIG_15
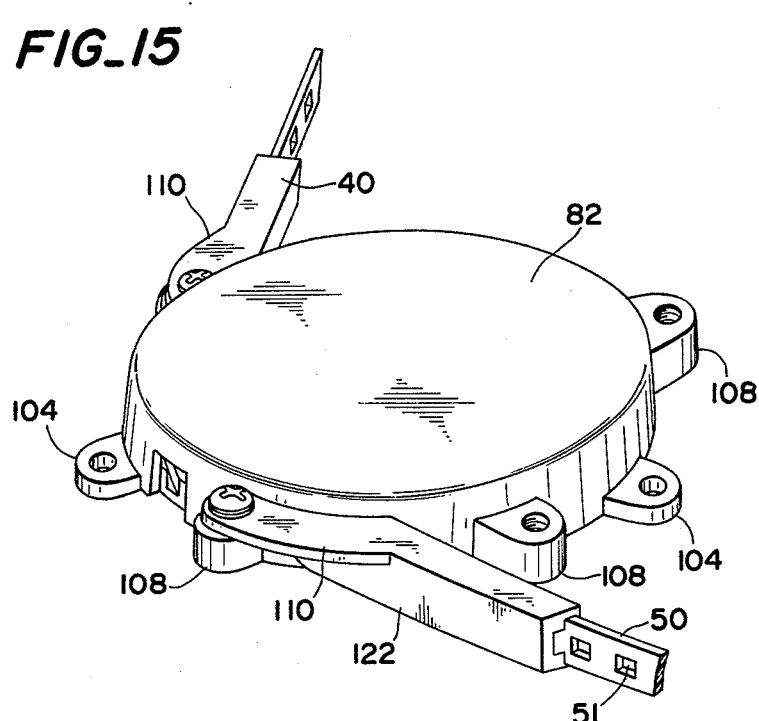
FIG_16
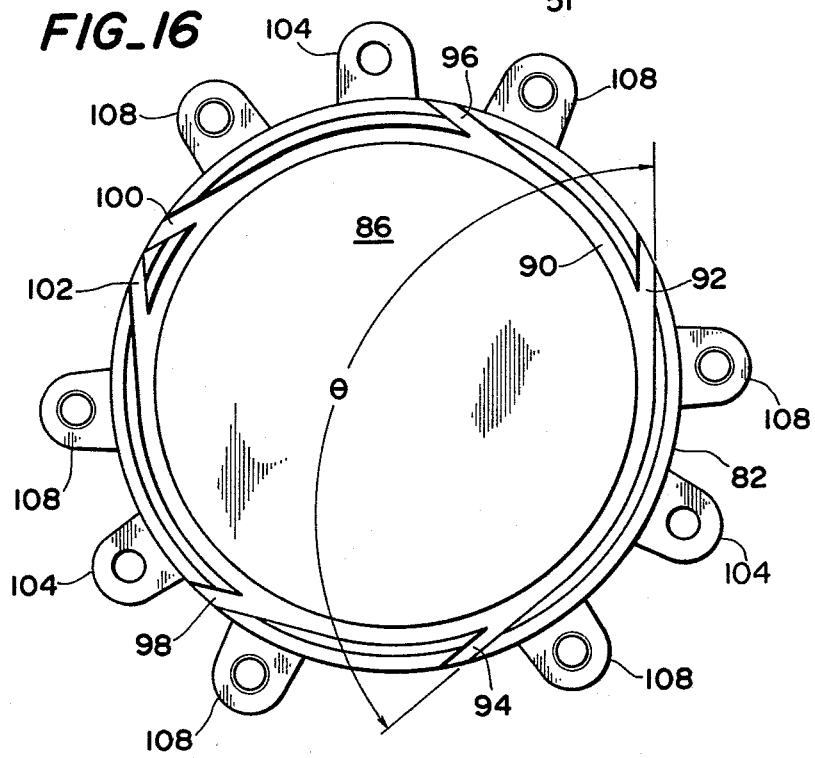

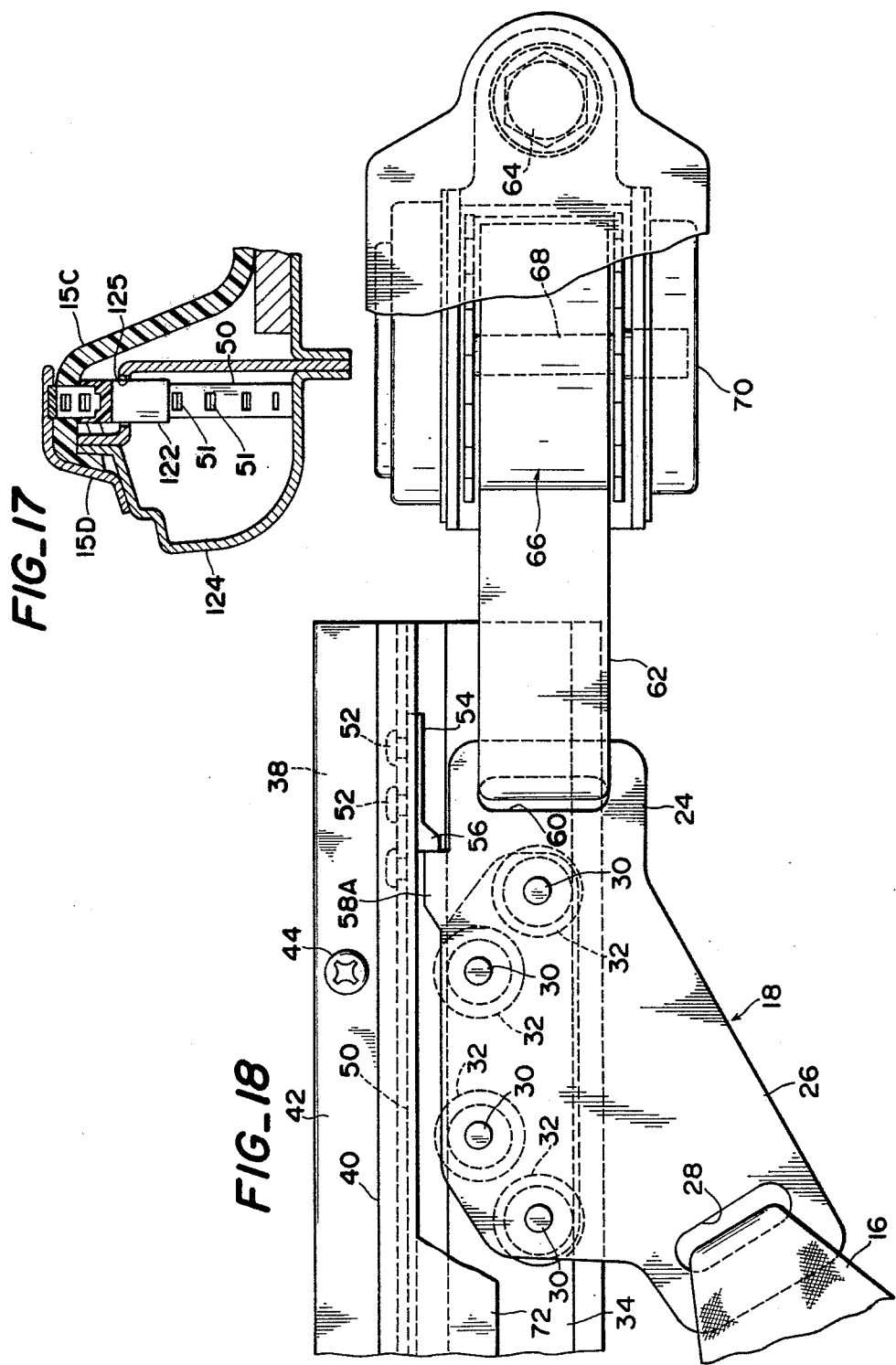

PASSIVE SEATBELT SYSTEM

BACKGROUND OF THE INVENTION

1. Field of the Invention

This invention relates to passive seatbelt systems and more particularly to passive seatbelt systems which automatically fasten and unfasten the seatbelt about a passenger.

2. Prior Art

It has been generally accepted that since seatbelts protect passengers during a vehicular emergency such as a collision and therefore, the use of seatbelt is desirable. However, because of the complexity of putting on the passenger restrictive seatbelt, the feeling of oppression when wearing a seatbelt, etc., the proportion of seatbelt wearers is very low.

For the above reason, passive seatbelt systems which can automatically fasten the seatbelt about a passenger after he has seated himself have been proposed. A typical type of passive seatbelt device has a guide rail fastened longitudinally to the roof side of the vehicle and a truck moving in this guide to which the outer end of a passenger restrictive seatbelt is fastened. This truck may be moved backward or forward by a motor to cause the passenger restrictive seatbelt to approach and recede from the passenger seat to automatically fasten and unfasten the seatbelt about the passenger.

However, these passive seatbelt devices require a guide rail to be fastened along the length of the roof side. Furthermore, since these devices also require pulleys be fastened to the inner body of the car to carry the wire which transmits the driving power from the motor to the truck moving in the guide rail, assembly is extremely difficult and the form is very complex.

SUMMARY OF THE INVENTION

Accordingly it is the general object of the present invention to provide a passive seatbelt system of simple construction and assembly.

It is another object of the present invention to provide a passive seatbelt system in which the components of the passive seatbelt system do not interfere with the placement of other vehicular parts.

In keeping with the principles of the present invention, the objects are accomplished by a unique passive seatbelt system. The passive seatbelt system includes a guide rail fastened longitudinally to a roof side of a vehicle, a truck movable along the guide rail, a seatbelt which has one end connected to the truck, a slide rail provided adjacent the guide rail and having one end coupled to the guide rail and the other end fastened to a roof support of the vehicle, a flexible tape provided in the slide rail and having one end coupled to the truck and a moving means coupled to the flexible tape for causing movement of the flexible tape whereby the seatbelt is caused to approach or recede from a seated passenger to thereby automatically fasten or unfasten the seatbelt.

BRIEF DESCRIPTION OF THE DRAWINGS

The above mentioned features and objects of the present invention will become more apparent with reference to the following description taken in conjunction with the accompanying drawings wherein like reference numerals denote like elements and in which:

FIG. 1 is a side view illustrating a first embodiment of a passive seatbelt system in accordance with the teachings of the present invention;

FIG. 2 is a front view of the vehicle of FIG. 1;

FIG. 3 is an enlargement of a portion of FIG. 1;

FIG. 4 is a cross section along the line IV—IV of FIG. 3;

FIG. 5 is a close-up view illustrating the tape;

FIG. 6 is a view of a part of FIG. 1 showing the stopper at the front end;

FIG. 7 is a cross section through the line VII—VII of FIG. 6;

FIG. 8 is a cross section through the line VIII—VIII of FIG. 3;

FIG. 9 is a cross section through the line IX—IX of FIG. 1;

FIG. 10 is a cross section through the line X—X of FIG. 1;

FIG. 11 is a close-up view seen from the inside of the vehicle showing the passive seatbelt system fastened to the front pillar and rocker panel;

FIG. 12 is a cross section through the line XII—XII of FIG. 11;

FIG. 13 is a front view illustrating a sprocket housing;

FIG. 14 is an exploded close-up of FIG. 13;

FIG. 15 is an assembled close-up of FIG. 14;

FIG. 16 is a back view of the sprocket housing;

FIG. 17 is a cross section through the line XVII—XVII of FIG. 1; and

FIG. 18 is a view analogous to that of FIG. 3 illustrating a second embodiment of a passive seatbelt system in accordance with the teachings of the present invention.

DETAILED DESCRIPTION OF THE INVENTION

Referring more particularly to the drawings, shown in FIGS. 1 and 2 is a passive seatbelt system in accordance with the teachings of the present invention. The passive seatbelt system includes a passenger restrictive belt 10 having an inner end 12 fastened by an inner anchor 14 to a vehicle bottom 15. Such an inner anchor 14 is fastened to the center of the vehicle facing left and right.

The outer end 16 of the belt 10 is fastened to truck 18 which can be moved back and forth of the vehicle along roof side member 20. By this motion, belt 10 is caused to approach or recede from the passenger seat 22. Thusly, the passenger seated in the seat 22 may be automatically fastened or unfastened from the belt 10. The truck 18 has, as shown in FIGS. 3 and 4, a movable plate 24 and the movable plate is provided with an extension 26 protruding toward the floor of the vehicle. The extension 26 has a slot 28 to which the outer end 16 of the belt 10 is fastened. The movable plate 24 has four axles 30 provided mutually parallel, as shown in FIG. 4, and drum-shaped wheels 32 having a smaller diameter at the center than at the edges provided on the four axles 30. The wheels 32, as shown in FIG. 4, are held by a guide rail 34 of C-shaped cross-section and move along the long axis of guide rail 34, that is forward or backward along the vehicle.

The guide rail 34 is secured to the inner side of the roof member 20 by a plurality of fastening screws 36 through the center of the C-shaped section and the open side is arranged and configured such that it faces toward the inside of the vehicle.

Also, the top of the guide rail 34 is formed into a flange 38 which is secured by fastening screws 44 to a flange 42 which extends from the top of slide rail 40 to thereby keep slide rail 40 and guide rail 34 parallel. The central portion of the slide rail 40 has a continuous rectangular groove 46 along its long axis. Slide rail 40 is further provided along its axis with slide grooves 48 which are wider than the width of the rectangular groove 46. A thick tape 50, as shown in FIG. 5, is provided in the slide groove 48 and can slide along the axis of the slide rail 40.

The thick tape 50, as shown in FIG. 5, is a rectangular cross-section and a plurality of holes 51 are provided in the tape 50 at regular intervals along its length. Furthermore, the rectangular cross-section of the thick tape 50 is a tight fit in the slide groove 48 of the slide rail 40 so that while an extensive force may naturally be transmitted, a compressive force may also be transmitted. It is desirable that the material for the thick tape 50 be a synthetic resin with an appropriate flexibility such that it may bend to a small radius of curvature.

Sliding block 54 is fastened with four rivets 52 to one end of the thick tape 50. From the sliding block 54 extends a protrusion 56 in the direction of movable plate 24 and a protrusion 58 extending from movable plate 24 in the direction of the sliding block 54 is received by an indentation 59 in the sliding block 54. By the insertion of the protrusion 58 into the indentation 59, when the sliding block 54 moves forward and backward with the thick tape 50, truck 18 is caused to simultaneously move forward and backward.

In the end of movable plate 24 toward the rear of vehicle, a slot 60 is formed and a narrow belt 62 is secured at one end to the slot 60. The other end of the narrow belt 62 is wound onto a drum 68 of a winding roller or retractor 66 which is secured by fastening bolt 64 to a roof side member 20 at the rear of guide rail 34. The winding roller 66 is a well known emergency locking retractor which will suddenly stop the unwinding of narrow belt 62 in a vehicular emergency. However, under normal conditions, narrow belt 62 is only wound up by the force of spring 70. Thusly, movable plate 24, which is connected to winding roller 60 by narrow belt 62 is moved toward the rear of the vehicle by the force of spring 70. In a vehicular emergency, by stopping the unwinding of the narrow belt 62 from the winding roller 66, the outer end 16 of passenger restrictive belt 10 is held firmly to roof side member 20.

A flange 62 extends from slide rail 40 in a direction opposite to that of flange 42, that is in a direction toward the floor of the vehicle as shown in FIG. 4. The inside roof lining, etc. is secured to the flange 72 by fastening screws 75 to provide a stable fastening method for the roof lining. Thus, guide rail 34, slide rail 40 and truck 18 are fastened in the space between the roof lining 74 and the roof side member 20. The guide rail 34, slide rail 40 and truck 18 do not project into the vehicle and only a narrow opening into the interior of the vehicle between the bottom 74A of the roof lining 74 and the bottom 20A exists. The truck 18 and thick tape 50 moving in the guide rail 34 and the slide rail 40 may not be seen from the interior of vehicle and an extremely safe design is formed.

At the front of the guide rail 34, as shown in FIGS. 6 and 7, a front L-shaped stopper is secured by fastening screws 77 with one end protruding toward the inside of guide rail 34. Thus, the front L-shaped stopper 76 is arranged such that it can stop the forward motion of the moving plate 24 at its point of furthest forward motion, shown by double dotted lines in FIG. 6.

As is shown in FIGS. 3 and 8, near the end of guide rail 34, a rear L-shaped stopper 78 is secured to slide rail 40 by fastening screw 77 such that one end of the stopper 70 protrudes into the rectangular groove 46 of slide rail 40. Thus, the L-shaped stopper 78, as shown in FIG. 3, restricts the rearward motion of the thick tape 50 in slide grooves 48.

Slide rail 40, as shown in FIGS. 9 and 10, is secured by fastening screws 44 to the inside of a vehicular front pillar 79 and descends along the front pillar 79. As shown in FIG. 11, a sprocket housing 82 is provided at the lower end of the slide rail 40. The sprocket housing 82, as shown in FIGS. 12 through 16, is shaped like a thick disc and the receiving indentation 86 in the housing for sprocket wheel 84 is substantially circular in shape. The sprocket wheel 84 and cover 88 are secured to the receiving indentation 86.

Arc-shaped grooves 90 are provided in the receiving indentation 86 and cover 88 of the sprocket housing 82. The arc-shaped grooves 90 are designed to receive the thick tape 50 and hold it in engagement with the sprocket wheel 84 and are of slightly lesser diameter than the outer diameter of receiving indentation 86 and slightly deeper than the receiving indentation 86. The arc-shaped grooves 90 are circumferential but do not need to be continued so as to be completely circumferential. Also, tape insertion channels 92 and 94 extending approximately tangential to the arc-shaped grooves 90 and are of the same depth as the arc-shaped grooves 90 are provided in the receiving indentation 86 and cover 88. The insertion channels 92 and 94 are used for the entrance and exit of the thick tape 50 as it is brought into engagement with sprocket wheel 84. The thick tape 50 passes through insertion channel 92 into the arc-shaped grooves 90 and engages with the sprocket wheel 84 and leaves the sprocket housing 82 by way of the other insertion channel 94.

Alternate insertion channels 96, 98, 100 and 102 are also provided in the sprocket housing and cover 88. These alternate insertion channels 96, 98 and 100 allow the intersection angle (Angle of FIG. 16) of the thick tape 50 to be altered or changed as it is bent by the sprocket housing 82. Also, three fastening flanges 104 are provided on the outer edge of the sprocket housing 82 at uniform intervals and, as shown in FIG. 12, the sprocket housing 82 is secured to the front pillar 79 of the vehicle by the flanges 104 by means of fastening screws 106.

Therefore, it is possible for the sprocket housing 82 to be assembled after the thick tape 50 is wound onto sprocket wheel 84 with high assembly efficiency. Also, at the time of assembly, the mutual position of the thick tape 50 and sprocket wheel 84 is made extremely simple by moving the movable plate 24, as shown in FIG. 6, against the L-shaped stopper 76 and then winding the thick tape 50 onto the sprocket wheel 84. On the outside of sprocket housing 84 are six support projections 108 of similar shape as the fastening flanges 104 but thicker. One of these support projections 108 is screwed onto fastening piece 110 which extends from the end of slide rail 40. Thus, in order to change the relative positions of the insertion and outlet channels for the thick tape 50 in the sprocket housing 82, one of the support projections 108 is chosen to bring one of the alternative insertion channels 96 through 102 into position.

Drive shaft 114 of reversible motor 112 is inserted through the center hole 111 of cover 88 into the sprocket housing 82 and sprocket wheel 84 is mounted on the drive shaft 114. The motor 112 is inserted into front pillar 79 through a cut-out 16 in the front pillar 79 and secured to the inside of the front pillar 79 by a bracket 118 and fastening screws 120. The motor is connected to the vehicular power supply (not shown) and powered by it. The power to the motor 112 is turned on by the opening and closing of the passenger door and the operation of a seat switch fastened to the passenger seat which test for the presence of a seated passenger. The motor 112 is arranged and configured such that the direct rotation of the motor 112 causes the sprocket wheel 84 of FIGS. 1 and 13 to rotate in a counterclockwise direction when the door is opened by a passenger to alight or get in and to rotate in a clockwise direction when the door is closed. Also, the number of revolutions is chosen so that the truck 18 stops before reaching the L-shaped stopper 76 at the front end of the guide rail 34. In other words, when the thick tape 50 is moving the truck 18 rearwards, the truck 18 stops before reaching the rear L-shaped stopper 78, which is shown in FIG. 3. The number of rotation is controlled by a timer circuit, counter or other device or circuit which exists in the prior art.

A second slide rail 122 is secured by fastening screws to the sprocket housing 82 in the same manner as slide rail 40. The second slide rail 122, as shown in FIG. 11, extends from the bottom of front pillar 79 and is inserted into rocket panel 124 through hole 125. Then, as shown in FIG. 1, when sprocket wheel 84 rotates in a counterclockwise direction, thick tape 50 is pushed into rocker panel 124 though the second slide rail 122.

It should be apparent that thick tape 50 must be of sufficient length to reach from the sprocket housing 82 to truck 18 and transmits the motion of sprocket wheel 82 to the truck 18. Furthermore, the interior of the vehicle is provided with a front pillar garnish 15A (as shown in FIG. 9), a cowl trim 15B (as shown in FIG. 10), carpet 15C and a scuff plate 15D (as shown in FIG. 15).

In practice, it is desirable that the guide rail 34 and the slide rail 40 be made from aluminum.

For the purposes of the following discussion, it is assumed that in FIG. 1 is shown a vehicle in operating condition with the belt 10 fastened about a passenger with truck 18 moved as far as possible to the rear guide rail 34 and the passenger fastened by the belt 10. In operation, during a vehicular emergency, such as a collision, the emergency locking device inside the winding roller 66 suddenly stops unwinding of the narrow belt 62 and the truck 18 holds the outer end 16 of belt 10 firmly to the roof side member 20 and the passenger is restrained and his safety is assured. When the passenger wishes to get out and opens the door, motor 112 rotates sprocket wheel 82 counterclockwise in FIG. 1 to thereby pull thick tape 50 and move thick tape 50 in the direction of arrow A along the slide rail 40. As a result, truck 18, which is connected to sliding block 54, is moved to the front of the vehicle along guide rail 34. Therefore, the outer end 16 of belt 10 substantially moves forward as shown by the double dotted lines of FIG. 1 and a gap opens between the belt 10 and the passenger seat 22 to form space for the passenger to easily get out of the vehicle.

When the passenger reboards the vehicle and closes the door after seating himself, motor 112 reverses and exerts a compression on thick tape 50 to move it in a direction opposite to that of arrow A. Thus, as sliding block 54 moves toward the winding roller 66, truck 18 is pulled by the force of spring 70 toward winding roller 66, that is toward the rear of the vehicle. As shown in FIG. 1, the passenger is automatically fastened by the belt 10.

An additional advantage is secured by the present construction in that any noise from the motor 112 is reduced. In particular, since the motor is mounted inside the lower portion of the front pillar 79, there is essentially no noise or disagreeable sensation transmitted to the passenger.

Referring to FIG. 18, shown therein is a second embodiment of a passive seatbelt system in accordance with the teachings of the present invention. In FIG. 18 is illustrated a different example of the connection between the movable plate 24 and the thick tape 50. Here, a projection 56 of sliding block 54 engages projection 58A which extends in the direction of thick tape 50 from movable plate 24. The projection 56 of sliding block 54 and the projection 58A of movable plate 24 are arranged such that they can be moved separately from each other. Thus, when sliding block 54 is moved forward by thick tape 50, movable plate 24 is moved toward the front of the vehicle. The movable plate 24 may also moved by itself toward the front of the vehicle. By this means, when the passenger wearing the belt 10 changes his driving position, movable plate 24 moves forward to unwind narrow belt 62 and the freedom of the passenger is increased. Also, when the outer end 16 is moved by thick tape 50, the passenger grasps the belt or when the passenger's body is moved about by an accident, truck 18 can separate from sliding block 54 and prevent damage to the parts.

With the above construction, the inner end 12 of belt 10 may also be fastened to a belt winding roller. Also, while the side rail is described as being fastened to the front pillar, it should be pointed out that the invention is not limited to such a construction and the slide rail may be fastened to other roof supports such as a center pillar and various other changes in the structure and the design are naturally possible.

From the above description, it should be apparent that the passive seatbelt system of the present invention possesses certain advantages as follows:

The construction is very simple, protrusion into the interior of the vehicle is minimal and the fastening of the slide rail to the roof lining is stable and uniform and provides an aesthetic appearance.

It should be apparent to one skilled in the art that the above described embodiments are merely illustrative but a few of many possible specific embodiments which represents the applications of the principles of the present invention. Numerous and various other arrangements can be readily devised by those skilled in the art without departing from the spirit and scope of the invention.

We claim:
1. A passive seatbelt device for a vehicle comprising:
    a guide rail fastened longitudinally to a roof side of the vehicle, said guide rail being substantially straight;
    a truck, movable along said guide rail, to which is fastened one end of a passenger-restrictive belt;
    stoppers provided at a front and rear ends of said guide rail to restrict movement of said truck;

a slide rail provided separately from said guide rail, one end portion of said slide rail being fastened along said guide rail and the other end portion being fastened along a front pillar of the vehicle;

a flange extending from said guide rail;

a flange extending from said slide rail, said flange of said guide rail being fastened to said flange extending from said slide rail to thereby fasten the slide rail and guide rail in parallel together;

a flexible tape running in said slide rail, one end of said tape being fastened to said truck; and a moving means connected to another end of said flexible tape causing the belt to approach or leave a passenger to thereby automatically fasten or unfasten the belt.

2. The passive seatbelt device of claim 1 wherein the slide rail fastened to said front pillar is covered by the front pillar garnish.

3. The passive seatbelt device of claim 1 wherein an end of said belt is fastened to the floor on the opposite side of the passenger seat from the truck.

4. The passive seatbelt device of claim 1 wherein said tape has a plurality of holes opened provided in its length, and said moving means comprises a sprocket wheel which engages with said holes.

5. The passive seatbelt device of claim 4 wherein a sliding block is fastened to said flexible tape and the truck is coupled to the sliding block.

6. The passive seatbelt device of claim 5 wherein said truck is urged toward the rear of the vehicle by a retractor.

* * * * *